(12) United States Patent
Huddle

(10) Patent No.: US 8,311,739 B2
(45) Date of Patent: Nov. 13, 2012

(54) INERTIAL NAVIGATION SYSTEM ERROR CORRECTION

(75) Inventor: James R. Huddle, Chatsworth, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 325 days.

(21) Appl. No.: 12/362,383

(22) Filed: Jan. 29, 2009

(65) Prior Publication Data
US 2009/0204323 A1    Aug. 13, 2009

Related U.S. Application Data

(62) Division of application No. 11/087,902, filed on Mar. 23, 2005, now Pat. No. 7,509,216.

(60) Provisional application No. 60/557,065, filed on Mar. 29, 2004.

(51) Int. Cl.
*G01C 21/00* (2006.01)

(52) U.S. Cl. ............... 701/469; 701/408; 342/357.21

(58) Field of Classification Search .......... 701/220, 701/221, 408, 468, 469, 518, 519, 520; 342/357.21, 342/357.23
See application file for complete search history.

(56) References Cited

U.S. PATENT DOCUMENTS

| | | | |
|---|---|---|---|
| 4,060,718 A | 11/1977 | Huddle | |
| 4,254,465 A * | 3/1981 | Land | 701/220 |
| 4,874,942 A * | 10/1989 | Clauser | 250/251 |
| 5,042,156 A | 8/1991 | Huddle | |
| 5,150,856 A | 9/1992 | Gaide | |
| 5,184,304 A | 2/1993 | Huddle | |
| 5,245,347 A * | 9/1993 | Bonta et al. | 342/149 |
| 5,339,684 A * | 8/1994 | Jircitano et al. | 73/178 R |
| 5,345,241 A | 9/1994 | Huddle | |
| 5,455,592 A | 10/1995 | Huddle | |
| 5,640,325 A | 6/1997 | Banbrook et al. | |
| 5,819,206 A * | 10/1998 | Horton et al. | 702/150 |
| 5,912,643 A * | 6/1999 | Chew et al. | 342/457 |
| 5,928,309 A * | 7/1999 | Korver et al. | 701/214 |
| 5,941,935 A * | 8/1999 | Fernandez | 701/220 |
| 5,986,547 A * | 11/1999 | Korver et al. | 340/500 |
| 6,014,103 A * | 1/2000 | Sumner et al. | 342/457 |
| 6,073,077 A * | 6/2000 | Hsu | 701/220 |
| 6,208,937 B1 * | 3/2001 | Huddle | 701/221 |

(Continued)

FOREIGN PATENT DOCUMENTS

EP    0 179 197    4/1986

OTHER PUBLICATIONS

European Search Report for corresponding European Application EP 05251937.8, mailed Aug. 2, 2005.

*Primary Examiner* — Helal A Algahaim

(57) ABSTRACT

Methods and apparatus for: (a) the correction of one or more elements determined from a first set of continuous gyro and accelerometer measurements comprising using a second set of discontinuously measured higher accuracy accelerometer measurements doubly integrated in an inertial coordinate system, (b) determining relative movement of a vehicle using a first set of acceleration measurements that do not include components of acceleration caused by the Earth's gravitational field, and a second set of acceleration measurements that do include components of acceleration caused by the Earth's gravitational field; and (c) correcting errors in an inertial navigation system positioned in a vehicle comprising using independently measured changes in position of the vehicle relative to an inertial coordinate frame.

9 Claims, 5 Drawing Sheets

U.S. PATENT DOCUMENTS

| | | | |
|---|---|---|---|
| 6,282,496 B1 * | 8/2001 | Chowdhary | 701/220 |
| 6,459,990 B1 * | 10/2002 | McCall et al. | 701/220 |
| 6,647,352 B1 * | 11/2003 | Horton | 702/151 |
| 6,651,002 B1 * | 11/2003 | Morgan | 701/220 |
| 6,859,727 B2 | 2/2005 | Bye et al. | |
| 7,142,983 B2 * | 11/2006 | Huddle | 701/220 |
| 7,418,364 B1 * | 8/2008 | Horton et al. | 702/153 |
| 2002/0022924 A1 * | 2/2002 | Begin | 701/207 |
| 2002/0194914 A1 * | 12/2002 | Foxlin et al. | 73/514.01 |
| 2003/0028340 A1 * | 2/2003 | Brunstein | 702/94 |
| 2004/0172173 A1 * | 9/2004 | Goto et al. | 701/1 |
| 2005/0004750 A1 * | 1/2005 | Huddle | 701/200 |

* cited by examiner

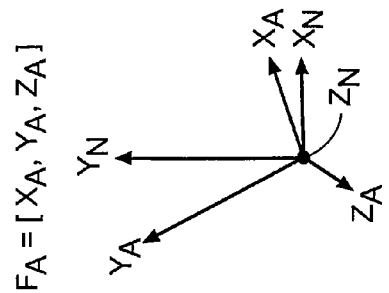
FIG. 2
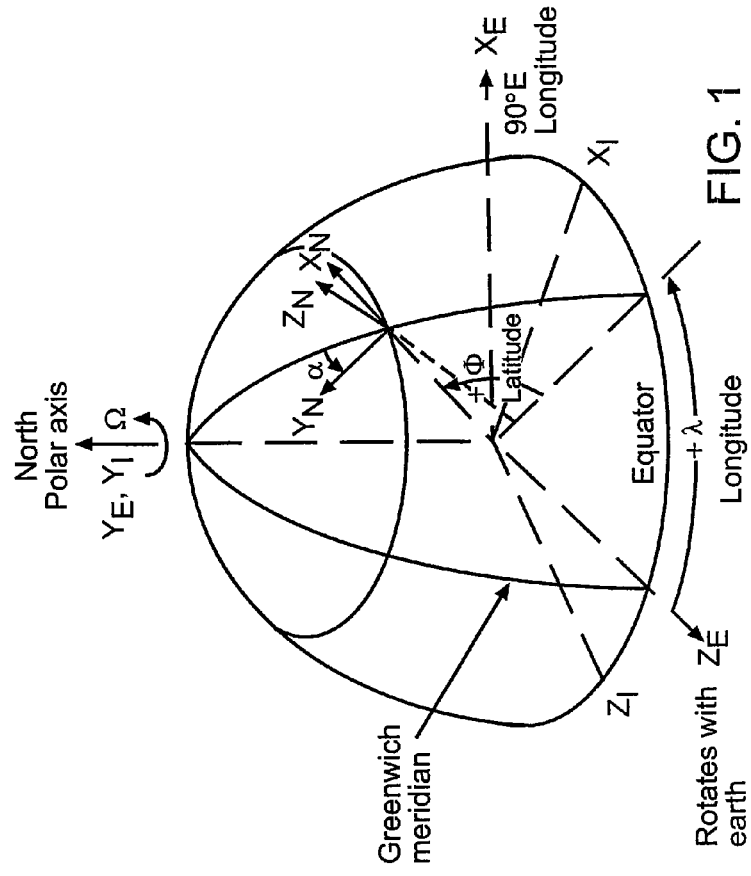
FIG. 3
FIG. 1
$F_I = [X_I, Y_I, Z_I]$ = Intertial coordinate system (does not rotate)
$F_E = [X_E, Y_E, Z_E]$ = Earth fixed coordinate system
$F_N = [X_N, Y_N, Z_N]$ = Navigation coordinate system

INERTIAL NAVIGATION SYSTEM ERROR CORRECTION

CROSS-REFERENCES TO RELATED APPLICATIONS

This application is a divisional of U.S. patent application Ser. No. 11/087,902 filed Mar. 23, 2005, now U.S. Pat. No. 7,509,216, granted Mar. 24, 2009, which claims the benefit of U.S. Provisional Patent Application No. 60/557,065, filed Mar. 29, 2004, herein incorporated by reference in its entirety.

STATEMENT REGARDING FEDERALLY SPONSORED RESEARCH

The U.S. Government has a paid-up license in this invention and the right in limited circumstances to require the patent owner to license others on reasonable terms as provided for by the terms of Grant No. W911NF-04-1-0047 awarded by the Defense Advanced Research Projects Agency (DARPA).

FIELD OF THE INVENTION

The present invention relates generally to inertial navigation system error correction.

BACKGROUND OF THE INVENTION

FIG. 1 defines three orthogonal coordinate frames, $F_I$, $F_E$, and $F_N$. The first coordinate frame, $F_I$, is called the Inertial Coordinate Frame with axes $[X_I, Y_I, Z_I]$ that are fixed with respect to inertial space as represented for example by stellar bodies. The $X_I$ and $Z_I$ axes of this coordinate frame lie nominally in the equatorial plane of the Earth and the $Y_I$ axis is nominally coincident with the polar axis of the Earth.

The second coordinate frame, $F_E$, is called the Earth-Fixed Coordinate Frame with axes $[X_E, Y_E, Z_E]$. The $X_E$ and $Z_E$ axes of this coordinate frame lie nominally in the equatorial plane of the Earth with the $Z_E$ axis at the Greenwich meridian and the $Y_E$ axis nominally coincident with the polar axis of the Earth. The axes $X_E$ and $Z_E$, rotate with respect to the Inertial Coordinate Frame, $F_I$, as the earth rotates about its polar axis.

The third coordinate frame, $F_N$, is called the Navigation Coordinate Frame with axes $[X_N, Y_N, Z_N]$ where the axes $X_N$ and $Y_N$ are nominally local level at the current position of a vehicle traveling relative to the surface of the Earth with the $Z_N$ axis coincident with the local vertical at the current position of the vehicle.

In FIGS. 1 and 2, a "wander-azimuth" angle $\alpha$ is shown which illustrates the rotation of the axes $X_N$ and $Y_N$ in the local level plane relative to the local East and North geodetic axes respectively. Without loss of generality, the local East, North and Vertical geodetic axes can be assumed as the Navigation Coordinate Frame, $F_N$, in which case the wander azimuth angle $\alpha$ would be identically zero.

In a standard "strapdown" inertial system mechanization, the inertial instruments which are gyroscopes ("gyros") and accelerometers, are fixed with respect to the vehicle and will have an orientation different than the Navigation Coordinate Frame, $F_N$, defined by the heading of the vehicle with respect to the North axis and the pitch and roll of the vehicle with respect to the local level plane at the current position of the vehicle. In this case the inertial instruments could lie along the axes of an orthogonal Vehicle-Body Coordinate Frame, $F_B$, with axes $[X_B, Y_B, Z_B]$ that are rotated with respect to the East, North and Vertical axes by the heading, pitch and roll angles.

In "gimbaled" inertial system mechanizations, the inertial instruments are isolated from the vehicle angular motion by a set of gimbals that use the gyro measurements to realize the stabilization.

One particular gimbaled inertial system mechanization that nominally aligns the axes of the Instrument Coordinate Frame, $F_A$, with axes $[X_A, Y_A, Z_A]$, along the East, North and Vertical Navigation Coordinate Frame, $F_N$, axes is called the "Local-Level, North-Slaved" system mechanization. As illustrated in FIG. 3, the Instrument Coordinate Frame, $F_A$, axes are in general slightly misaligned with respect to the Navigation Coordinate Frame, $F_N$, axes due to errors in the measurements of force made by the accelerometers and angular rate made by the gyros along the Instrument Coordinate Frame, $F_A$, axes. These small angular deviations of the Instrument Coordinate Frame, $F_A$, to the Navigation Coordinate Frame, $F_N$, at the true current position of the vehicle about the East, North and Vertical axes are called tilts and can be denoted respectively by three small angles, $[\phi_E, \phi_N, \phi_Z]$.

In another gimbaled inertial system mechanization, the Instrument Coordinate Frame, $F_A$, is nominally aligned with the axes of the Inertial Coordinate Frame, $F_I$. This particular gimbaled system mechanization is called the "Space Stable" inertial system mechanization. Again small angular errors will exist in achieving alignment of the Instrument Coordinate Frame, $F_A$, with the axes of the Inertial Coordinate Frame, $F_I$, due to errors in the measurements made by the inertial instruments. These errors can be expressed about the axes of the Instrument Coordinate Frame, $F_A$, or about the about the East, North and Vertical navigation axes using the transformation matrix, $[_{Inst}T_{Nav}]$, between the Instrument Coordinate Frame, $F_A$, and the Navigation Coordinate Frame, $F_N$.

For the strapdown mechanization referred to above, these same types of angular errors will occur due to inertial instrument measurement errors. For the strapdown system mechanization, the orientation of the Inertial Instrument Frame, $F_A$, can be assumed to be coincident with the Vehicle-Body Coordinate Frame, $F_B$, without loss of generality. In this case the orientation of the Inertial Instrument Frame, $F_A$, is computed with respect to the Navigation Coordinate Frame, $F_N$, using the inertial instrument measurements rather than being rotated to be nominally aligned with the Navigation Coordinate Frame, $F_N$, using the inertial instrument measurements.

In either the strapdown or gimbaled inertial instrument mechanizations, small angular tilt errors $[(\phi_E, \phi_N, \phi_Z)]$, will exist due to the errors in the measurement made by the gyros and accelerometers. For the strapdown mechanization, the errors will exist in the computed transformation, $[_{Nav}T_{Instr}]_{Computed}$, between the Instrument Coordinate Frame, $F_A$, and the Navigation Coordinate Frame, $F_N$. The relationship between the computed transformation, $[_{Nav}T_{Instr}]_{Comp}$, and the ideal transformation, $[_{Nav}T_{Instr}]_{Ideal}$, can be expressed as: $[_{Nav}T_{Instr}]_{Comp} = \delta[_{Nav}T_{Instr}]$ $[_{Nav}T_{Instr}]_{Ideal} = [I+\phi][_{Nav}T_{Instr}]_{Ideal}$, where:

$$[\varphi] = \begin{bmatrix} 0 & \varphi_U & -\varphi_N \\ -\varphi_U & 0 & \varphi_E \\ \varphi_N & -\varphi_E & 0 \end{bmatrix}; \text{ and } [I+\varphi] = \begin{bmatrix} 1 & \varphi_U & -\varphi_N \\ -\varphi_U & 1 & \varphi_E \\ \varphi_N & -\varphi_E & 1 \end{bmatrix}.$$

For the case of the gimbaled system mechanization, the ideal transformation occurs when the Instrument Coordinate Frame, $F_A$, is rotated so as to be coincident with Navigation Coordinate Frame, $F_N$. In terms of the notation above: $[_{Nav}T_{Instr}]_{Ideal}=[I]$. However due to errors in the gyro and accelerometer measurements, the error in realizing the ideal situation for the gimbaled case is expressed by the matrix $[I+\phi]$.

Consequently in both the strapdown and gimbaled inertial navigation system mechanization cases, a means of measurement of the orientation error expressed by the three tilt angles about the East, North and Vertical axes $[(\phi_E, \phi_N, \phi_Z]$ is beneficial.

A discussion of the nature of the errors for the strapdown and gimbaled inertial navigation system mechanizations discussed above are derived in detail in: "*Inertial Navigation System Error-Model Considerations in Kalman Filtering Applications*", by James R. Huddle in Volume 20 of *Control and Dynamic Systems* edited by C. T. Leondes, Academic Press, 1983, Pp. 293-339, herein incorporated by reference in its entirety. This reference proves the equivalence of error models for the strapdown and gimbaled inertial navigation system error models in so far as the navigation system equations required to implement these system mechanizations are concerned. Consequently, a description in the context of the strapdown inertial navigation system mechanization is readily applied to other inertial navigation systems such that a description for each type of inertial navigation system is not required.

FIG. 4 depicts the signal flow for the strapdown navigation system mechanization. At the left of FIG. 4, measurements of force, $[a+g]_{Instrument}$, are made by the accelerometers in the Instrument Coordinate Frame, $F_A$, of FIG. 2. The force measurement $[a+g]_{Instrument}$ is the sum of acceleration of the vehicle/navigation system with respect to inertial space plus the force of the gravity vector along the accelerometer sensing axes. To employ these accelerometer measurements for the navigation solution, they must first be transformed to the Navigation Coordinate Frame, $F_N$, via the time varying transformation $_{Nav}T(t)_{Instr}$ as shown in the figure. In FIG. 4, the transformed measurements are denoted $[a+g]_{Navigation}$.

Once the force measurements are expressed in the Navigation Coordinate Frame, $F_N$, then the gravity vector, $g_{Nav}$, in that frame nominally along the local vertical can be subtracted from the measurement to obtain the acceleration, $a_{Nav}$, of the vehicle with respect to inertial space in the Navigation Coordinate Frame, $F_N$.

To realize the function of navigation with respect to the Earth, the vehicle acceleration $a_{Nav}$ with respect to inertial space in the Navigation Coordinate Frame, $F_N$, must be processed to obtain the time derivative of vehicle velocity with respect to the Earth taken with respect to the Navigation Coordinate Frame, $F_N$. This conversion is realized through the use of a Coriolis Acceleration Correction as shown in the figure.

Subsequent integration of the corrected measurement produces the vehicle velocity with respect to the Earth, $V_{Vehicle/E}(t)$, expressed in the Navigation Coordinate Frame, $F_N$, as shown in FIG. 4.

The computed vehicle velocity with respect to the Earth, $V_{Vehicle/E}(t)$, can be transformed via the transformation $[_{Earth}T(t)_{Nav}]$ to the Earth-Fixed Coordinate Frame using knowledge of the current position of the vehicle (latitude $\Phi$, and longitude, $\lambda$, as shown in FIG. 1), and integrated to obtain change in position of the vehicle with respect to the Earth in terms of latitude and longitude. Knowledge of the computed latitude of the vehicle with respect to the Earth allows computation of the components ($\Omega_N$ and $\Omega_Z$) of the Earth rotation vector, $\Omega$, with $\Omega_N$ being the component around the North axis, $X_N$, of the Navigation Coordinate Frame, $F_N$, and $\Omega_Z$ being the component around the Vertical axis, $Z_N$, of the Navigation Coordinate Frame, $F_Z$.

The computation of the time varying transformation $[_{Nav}T(t)_{Instr}]_{Computed}$, from the Instrument Coordinate Frame, $F_A$, to the Navigation Coordinate Frame, $F_N$, requires knowledge of the angular rate of one frame relative to the other frame. The gyros in the Instrument Coordinate Frame, $F_A$, measure the angular rate of this coordinate frame with respect to inertial space indicated by $\omega_{Instrument}(t)$ in FIG. 4. The angular rate of the Navigation Coordinate Frame, $F_N$, with respect to Inertial Space $\omega_{Nav}(t)$ is the sum of the angular rate of the Earth with respect to Inertial Space, $\Omega$, and the relative angular rate of the Navigation Coordinate Frame, $F_N$, with respect to the Earth. The relative angular rate of the Navigation Coordinate Frame, $F_N$, with respect to the Earth $\rho_{Nav}(t)$, is computed by dividing the vehicle velocity with respect to the Earth by the local radius of curvature, R, of the Earth at the current position of the vehicle, plus the altitude, h, of the vehicle above the Earth's surface as shown in FIG. 4. The difference of these two angular rate vectors $[\omega_{Nav} - \omega_{Instrument}]$, provides the angular rate of the of the Navigation Coordinate Frame, $F_N$, relative to the Instrument Coordinate Frame, $F_A$, that enables the computation of the required transformation $[_{Nav}T(t)_{Instr}]_{Computed}$ shown in FIG. 4.

SUMMARY OF THE INVENTION

The present invention is directed to methods and apparatus that correct modeled errors in an inertial navigation system using Kalman filtering of a determined difference between an independent measurement and an estimate of the independent measurement. The independent measurement is a measurement of the change in position, velocity, or acceleration of a vehicle relative to an inertial coordinate frame. The estimate of this measurement is computed using the inertial navigation system.

In an exemplary embodiment, the present invention is a method for the correction of continuous gyro and accelerometer measurements comprising using discontinuously measured higher accuracy accelerometer measurements doubly integrated in an inertial coordinate system.

In another exemplary embodiment, the present invention is a vehicle inertial navigation system that determines relative movement of the vehicle using a first set of acceleration measurements that do not include components of acceleration caused by the Earth's gravitational field, and a second set of acceleration measurements that do include components of acceleration caused by the Earth's gravitational field.

In yet another exemplary embodiment, the present invention is a method of correcting errors in an inertial navigation system positioned in a vehicle comprising using independently measured changes in position of the vehicle relative to an inertial coordinate frame.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 1 illustrates the relationship between three coordinate frames.

FIG. 2 provides a detailed view of a navigation coordinate frame of FIG. 1.

FIG. 3 illustrates the relationship between a navigation coordinate frame and an instrument coordinate frame.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Errors will occur in the variables of the navigation solution that is comprised of the computed elements ($_{Nav}T(t)_{Instr}$, $V_{Vehicle/E}(t)$, $\Phi$, $\lambda$, h, $\rho_{Nav}(t)$, $\omega_{Nav}(t)$, $_{Earth}T(t)_{Nav}$) due the errors in the measurement of force $[a+g]_{Instrument}$ by the accelerometers, and angular rate $\omega_{Instrument}$ by the gyros. Detection of the error in any of these computed elements by an independent sensor will permit correction of the errors in all the computed elements since they are related through the previously described computational process.

A Kalman filter that models all the significant errors in the measurements made by the gyros and accelerometers and the errors that these measurement errors cause in the computation of the inertial navigation system solution can realize this correction process.

As such, a method of correcting the errors in inertial navigation systems such as the one previously described involves using independently measured changes in position of the vehicle with respect to inertial space along the axes of the Inertial Coordinate Frame, $F_I$. This method can be implemented in three steps.

Figure 5:
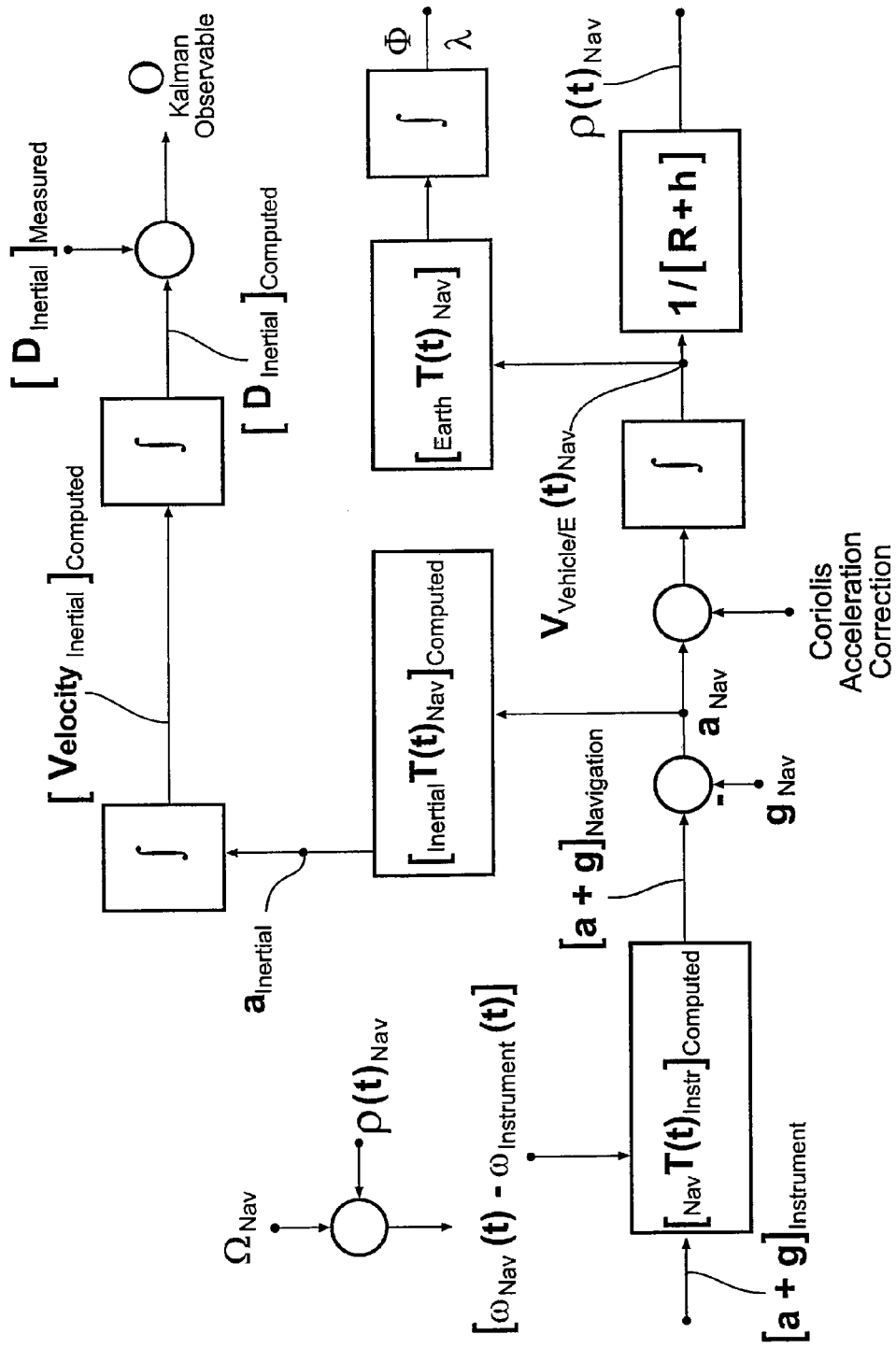
FIG. 5 is a partial signal flow diagram of an inertial navigation system in accordance with an exemplary embodiment of the invention.

A first step is to remove the force of gravity from the accelerometer measurements of acceleration, $[a+g]_{Instrument}$, of the vehicle with respect to inertial space and the force of gravity along the axes of the Navigation Coordinate Frame, $F_N$. This is illustrated in FIG. 5 where $a_{Nav} = \{[_{Nav}T_{Instr}]_{Computed}[a+g]_{Instrument}\} - g_{Nav}$.

A second step in the process is to transform the measurement of vehicle acceleration, $a_{Nav}$, with respect to inertial space in the Navigation Coordinate Frame, $F_N$, to the Inertial Coordinate Frame, $F_I$. As illustrated in FIG. 5, $a_{Inertial} = \{[_{Inertial}T_{Nav}]_{Computed}[a_{Nav}]\}$.

A third step in the process is to then doubly integrate this transformed measurement of vehicle acceleration, $a_{Inertial}$, with respect to inertial space in the Inertial Coordinate Frame, $F_I$. A first integration obtains the vehicle velocity change with respect to Inertial Space: $[Velocity_{Inertial}]_{Computed} = \int a_{Inertial} dt$. A second integration provides the vehicle position change with respect to inertial space: $[D_{Inertial}]_{Computed} = \int [Velocity_{Inertial}]_{Computed} dt$.

It is important to note that the two computed variables $[Velocity_{Inertial}]_{Computed}$ and $[D_{Inertial}]_{Computed}$ are quite different from the vehicle velocity with respect to the Earth and the vehicle position change with respect to the Earth. This fact is illustrated in FIG. 5 by the use of separate signal flow paths for each of these two different computations.

As further shown in FIG. 5, the estimate $[D_{Inertial}]_{Computed}$ of the change in vehicle position relative to the Inertial Coordinate Frame, $F_I$, based upon the inertial navigation system solution is compared with an independent measurement $[D_{Inertial}]_{Independent}$ of this variable. The difference between the estimate and the independent measurement is due to the errors in the estimate and the errors in the independent sensor measurement and is called the Kalman Observable, O.

Further, the errors in the estimate of the measurement $[D_{Inertial}]_{Computed}$, is due to the errors in the measurements of force by the accelerometers, the measurements of angular rate by the gyros and the errors in the transformations: $[_{Nav}T_{Instr}]_{Computed}$ $[_{Inertial}T_{Nav}]_{Computed}$, computed of the inertial navigation system. The observed difference can be processed by a Kalman filter to make corrections to all the errors in the inertial navigation system and the independent sensor that are modeled in by the Kalman filter.

The expression for the error in the transformation $[_{Inertial}T_{Nav}]_{Computed}$ is a function of the error in computed latitude $\delta\Phi$, longitude $\delta\lambda$, and the time, $\delta t$. The error in latitude, $\delta\Phi$, resides about the East navigation axis while the errors in longitude, $\delta\lambda$, and time, $\delta t$, reside about the polar axis of the Earth. For latitude error defined as counter-clockwise about the East axis, the relationship between the computed and ideal transformation is expressed: $[_{Inertial}T_{Nav}]_{Computed} = [I+\delta\theta] [_{Inertial}T_{Nav}]_{Ideal}$, where:

$$[\delta\theta] = \begin{bmatrix} 0 & \delta\Phi\sin(\Lambda) & \delta\Phi\cos(\Lambda) \\ -\delta\Phi\sin(\Lambda) & 0 & -\delta\Lambda \\ -\delta\Phi\cos(\Lambda) & \delta\Lambda & 0 \end{bmatrix}; \qquad (a)$$

(b) $\Lambda = \lambda + \Omega t$ is the angle of rotation about the polar axis from the $Z_I$ inertial axis to the current position of the vehicle in the equatorial plane; and (c) $\delta\Lambda = \delta\lambda + \Omega\delta t$ is the error in this angle due to error in computed longitude and the error in the knowledge of time.

The full expression for the error in the acceleration measurement transformed to the Inertial Coordinate Frame, $F_I$, is expressed: $\delta a_{Inertial} = [\delta\theta][a_{Inertial}] + [_{Inertial}T_{Nav}][\phi][a_{Nav}] + [_{Inertial}T_{Instr}][\delta a_{Instr}] + [_{Inertial}T_{Navigation}][\delta g_{Nav}]$, where the terms: $a_{Inertial}$, $[_{Inertial}T_{Nav}]$, $a_{Nav}$, and $[_{Inertial}T_{Instr}]$, are ideal representations of the indicated variables. The terms: $[\delta\theta]$, and $[\phi]$ represent the errors in the indicated transformations. The term $[\delta a_{Instr}]$ is the error in the accelerometer measurement due to instrument error sources. The term: $[\delta g_{Nav}]$ is the error in the knowledge of gravity in the Navigation Coordinate Frame, $F_N$.

From this analysis, there is a clear basis for the detection of these errors in the Kalman Observable O, defined above once the errors are detected, the inertial navigation system can compensate for them to provide a more accurate output of the relative movement of the vehicle.

Figure 6:
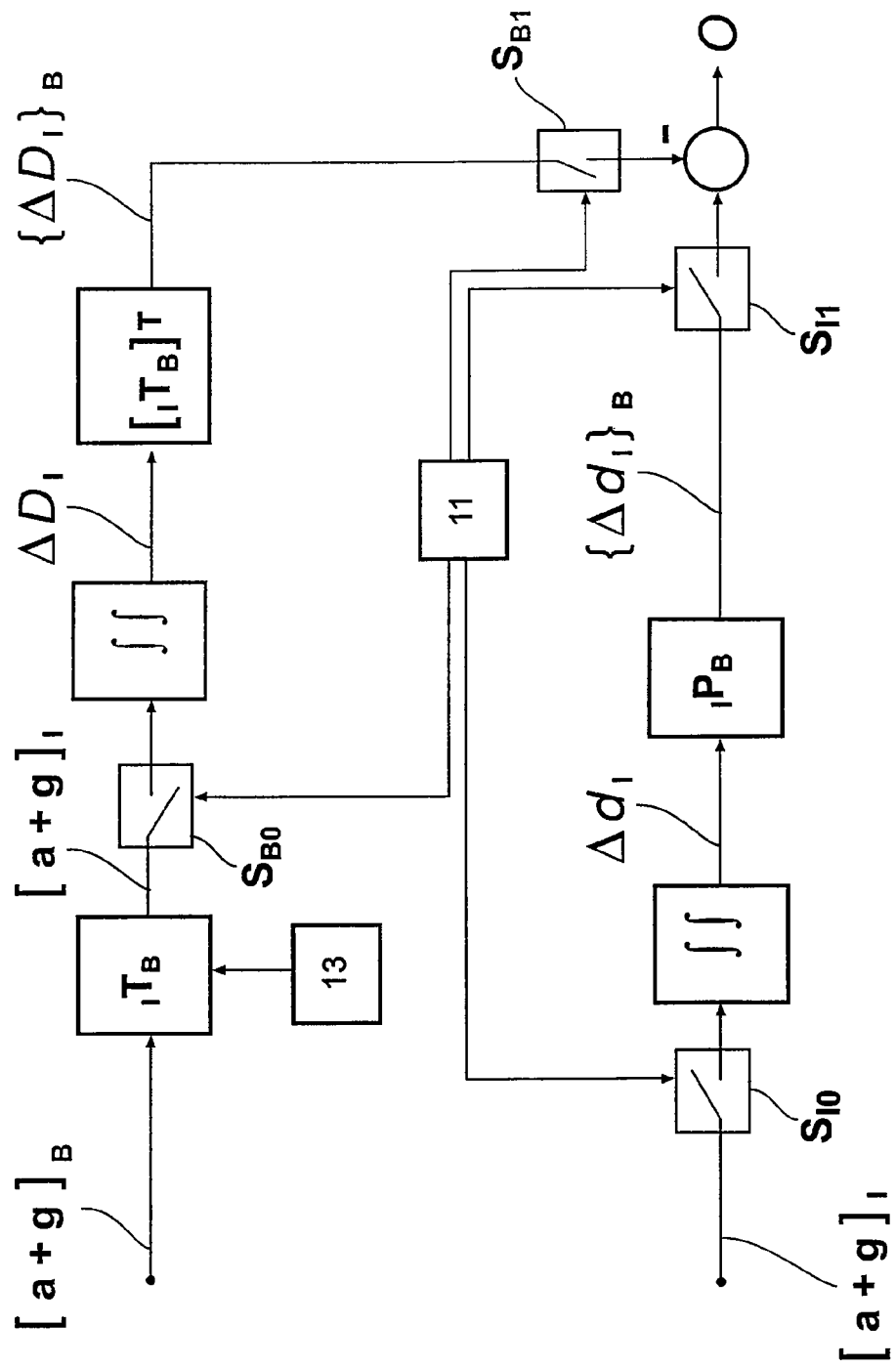
FIG. 6 is a partial signal flow diagram of another inertial navigation system in accordance with an exemplary embodiment of the invention.

In another embodiment, as shown in FIG. 6, a method for the correction of continuous gyro and accelerometer measurements comprises using discontinuously measured higher accuracy accelerometer measurements doubly integrated in an inertial coordinate system to provide such correction. As shown, a discrete observable O is determined by examining the difference between $\{\Delta D_I\}_B$ with $\{\Delta d_I\}_B$. $\{\Delta D_I\}_B$ is obtained by transforming accelerometer measurements, $[a+g]_B$, in a moving coordinate frame to an inertial frame using the transformation matrix $[_IT_B]$. The transformed measurements are then doubly integrated over a discrete time interval t between time $t_0$ and time $t_1$. At the end of the time interval t, the transformed and doubly integrated measurements are transformed back onto the moving coordinate frame using $[_IT_B^T]$ to produce $\{\Delta D_I\}_B$. $\{\Delta d_I\}_B$ is obtained by doubly integrating accelerometer measurements $[a+g]_I$ over the same discrete time interval t. At the end of the timer interval t, the doubly integrated measurements are projected onto the moving coordinate frame using the projection/transformation matrix $[_IP_B]$ to produce $\{\Delta d_I\}_B$. The difference in the means to measure $[a+g]_I$, $[a+g]_B$, $[_IT_B]$, and $[_IP_B]$ leads to observability of the errors in obtaining them with respect to each other.

In FIG. 6, a synchronization mechanism 11 is utilized to simultaneously close the switches $S_{B0}$ and $S_{I0}$ at time $t_0$ begin the time interval and the double integration of $[a+g]_I$ and the transformed $[a+g]_B$, and to close the switches $S_{B1}$ and $S_{I1}$ at time $t_1$ so that the results of the double integrations can be compared to produce the observable O. In preferred embodiments, $[a+g]_I$ will be measured periodically over the time interval t, but will be measured directly in the inertial coordinate frame. $[_IT_B]$ and $[_IP_B]$ are completely independent of each other. $[_IT_B]$ is, after being initially established, maintained as a function of time using continuous gyro measurements. $[_IP_B]$ is realized by the orientation of observation axes resident in the moving body frame coordinates.

It is contemplated that $[a+g]_B$ will in some instances be continuously available as being provided by an inertial measuring unit (IMU) of a vehicles inertial navigation system, while $[a+g]_I$ may only be occasionally available. In such instances, each period of availability of $[a+g]_I$ would constitute a period t over which the two independent sets of acceleration measurements are integrated for comparison. Alternatively, if $[a+g]_I$ is continuously available, the double integration of acceleration/force can begin at any time $t_0$ and end at any time $t_1$, and the frequency and duration over which such intervals occur can be determined based on other factors.

Figure 7:
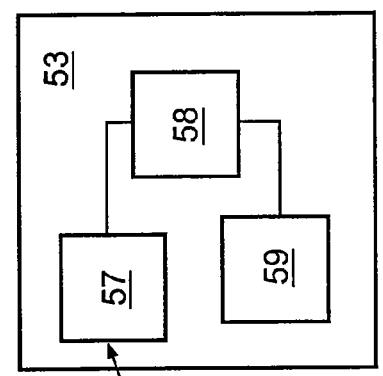
FIG. 7 is a schematic view of another system in accordance with an exemplary embodiment of the invention.

FIG. 7 provides a schematic illustrations of a system that can incorporate the methods described above. In FIG. 7, a system 51 includes a vehicle 53 and an external source of measurement data 55. The vehicle 53 includes a measurement receiving unit 57 and an IMU 59, and a comparison unit 58. The unit 58 determines relative movement of the vehicle 53 using a first set of acceleration measurements, obtained from source 55 via receiving unit 57, that do not include components of acceleration caused by the Earth's gravitational field, and a second set of acceleration measurements, obtained from IMU 59, that do include components of acceleration caused by the Earth's gravitational field.

Figure 8:
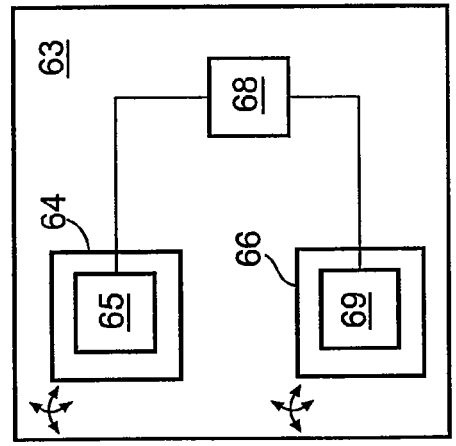
FIG. 8 is a schematic view of a still another system in accordance with an exemplary embodiment of the invention.

FIG. 8 provides a schematic illustration of another system that can incorporate the methods described above. In FIG. 8, a system 61 includes a vehicle 63 having IMUs 65, and 69, where the IMUs 65 and 69 each measure movement in separate coordinate frames. As both IMUs are on board the vehicle 63, one or two movement assemblies 64 and 66 can be utilized to maintain measurement coordinate frame separation between the IMUs 65 and 69, e.g. IMUs 65 and/or 69 may be gimbaled. The unit 68 determines relative movement of the vehicle 63 using a first set of acceleration measurements, obtained from IMU 65 relative to a first coordinate frame fixed relative to the assembly 64, and a second set of acceleration measurements, obtained from IMU 69 relative to a second coordinate frame fixed relative to the assembly 66. If only one movement assembly is used, one IMU will measure acceleration relative to a coordinate frame fixed relative to the body of the vehicle 63.

The methods and apparatus described herein are applicable regardless of the type of vehicle for which position determinations are being made. Among others, such vehicles include aircraft, watercraft, and ground vehicles such as ships, boats, airplanes, rockets, missiles, trucks, and tanks. Moreover, the term "vehicle" as used herein is intended to include a moveable container or structure. As such, the methods and apparatus described herein are also applicable to, among others, portable and/or hand held positioning devices, and cargo containers.

The methods and apparatus described herein are also applicable regardless of the means used to obtain measurements. As such, measurements may be obtained from, among others, IMUs that include accelerometers and gyroscopes, independent accelerometers, global positioning systems (GPSs), and sensors from other platforms.

The methods and apparatus described herein are also applicable regardless of the means used to perform the double integrations and/or the transformation between coordinate systems. As such, analog, digital or a combination of analog and digital methods may be used.

Figure 4:
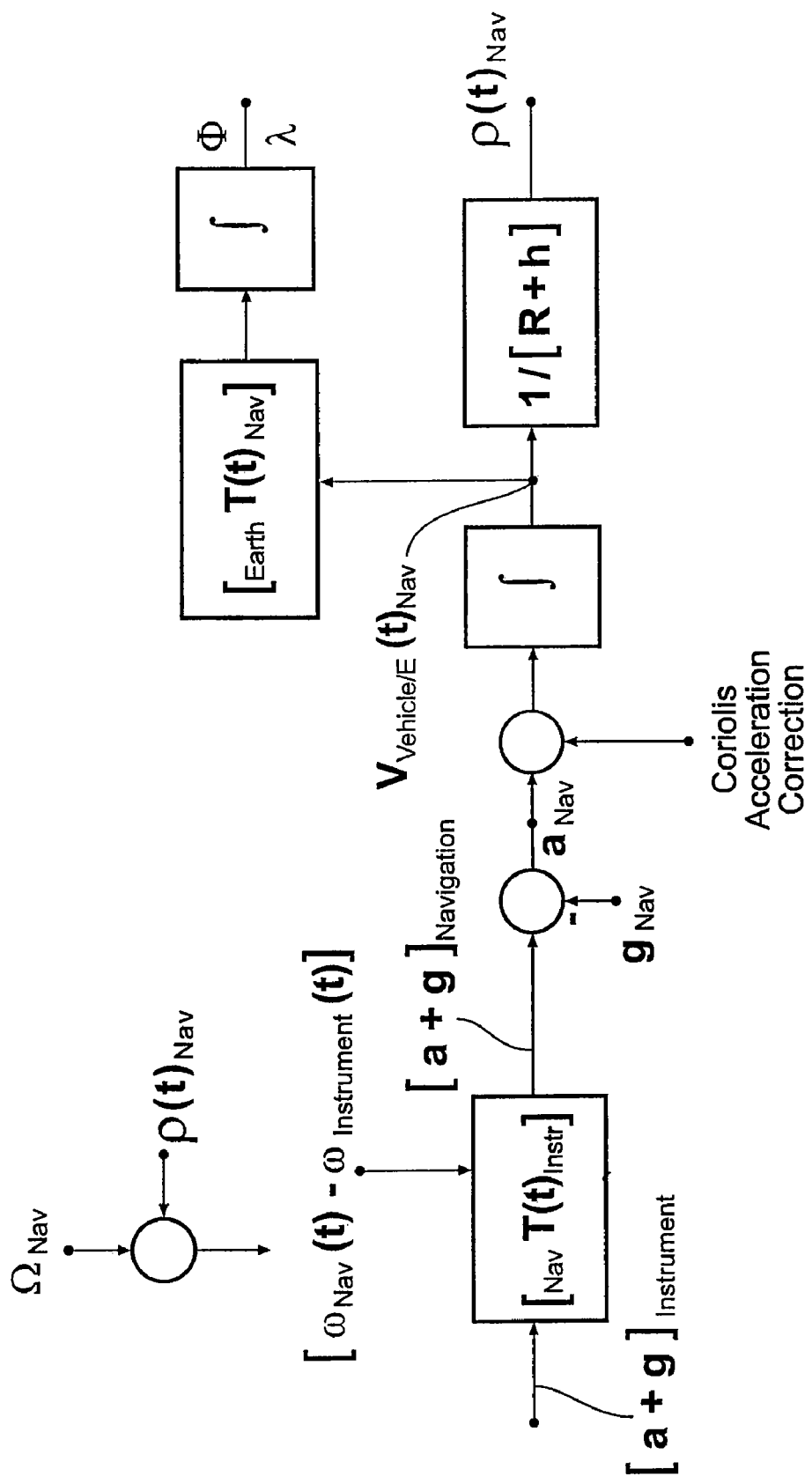
FIG. 4 is a partial signal flow of a prior art inertial navigation system.

The elements and flow paths illustrated in FIGS. 3 and 4, and the structures illustrated in FIGS. 5 and 6 are provided for illustrative purposes only. As such, embodiments of the present invention may include modified forms of the elements, flow paths and/or structures illustrated, and/or different or additional elements, flow paths and structures.

From the foregoing, it should be evident that one exemplary embodiment of the present invention is a method for the correction of one or more elements determined from a first set of continuous gyro and accelerometer measurements comprising using a second set of discontinuously measured higher accuracy accelerometer measurements doubly integrated in an inertial coordinate system. In such an embodiment, the second set of accelerometer measurements may be obtained from a measurement source, such as a global positioning system, external to a vehicle where the first set of continuous gyro and accelerometer measurements are performed on board the vehicle. In other instances, the first and second set of accelerometer measurements may be performed on board a common vehicle. It should also be evident that the one or more elements include at least one of: (a) a transformation matrix used to convert between an instrument coordinate frame and a navigation coordinate frame; (b) a transformation matrix used to convert between an Earth fixed coordinate frame and a navigation coordinate frame; (c) the velocity of a vehicle relative to the earth; (d) a vehicle's latitude, longitude, and/or height; (e) an angular rate of rotation of a navigation coordinate frame relative to an inertial coordinate frame; and (f) an angular rate of rotation of a navigation coordinate frame relative to an Earth fixed coordinate frame.

It should also be evident that another exemplary embodiment of the present invention is a vehicle inertial navigation system that determines relative movement of the vehicle using a first set of acceleration measurements that do not include components of acceleration caused by the Earth's gravitational field, and a second set of acceleration measurements that do include components of acceleration caused by the Earth's gravitational field. In such an embodiment, first set of acceleration measurements may be obtained relative to a first orthogonal coordinate frame, and the second set of acceleration measurements relative to a second orthogonal coordinate frame, where the origin of the first orthogonal coordinate frame and the origin of the second orthogonal coordinate frames are not co-located.

Also, in such an embodiment, one or more of the following may be true: (a) movement of the vehicle may cause relative movement between the first coordinate frame and second coordinate frame; (b) a Kalman filter is used to combine the first set of acceleration measurements and the second set of acceleration measurements; (c) the system removes gravity components from the second set of accelerometer measurements prior to using the Kalman filter to combine the first and second sets of acceleration measurements; (d) the system transforms the second set of acceleration measurements from the second coordinate frame to the first coordinate frame prior to using the Kalman filter to combine the first and second sets of acceleration measurements; (e) the system integrates the transformed second set of acceleration measurements with respect to the first coordinate frame prior to using the Kalman filter to combine the first and second sets of acceleration measurements; and (f) the system integrates the first set of acceleration measurements with respect to the first coordinate frame prior to using the Kalman filter to combine the first and second sets of acceleration measurements.

Further, in such an embodiment the system may use differences between the first set of acceleration measurements and the second set of acceleration measurements to: (i) periodically modify a transformation matrix used to convert between an instrument coordinate frame and a navigation coordinate frame; (ii) the system uses differences between the first set of acceleration measurements and the second set of acceleration measurements to periodically modify a transformation matrix used to convert between an Earth fixed coordinate frame and a navigation coordinate frame; (iii) to periodically modify how the system determines the velocity of the vehicle relative to the earth; (iv) to periodically modify how the system determines the vehicle's latitude, longitude, and/or height; (v) to periodically modify how the system determines an angular rate of rotation of a navigation coordinate frame relative to an inertial coordinate frame; (vi) to periodically modify how the system determines an angular rate of rotation of a navigation coordinate frame relative to an Earth fixed coordinate frame.

From the foregoing, it should also be evident that another exemplary embodiment of the present invention is a method of correcting errors in an inertial navigation system positioned in a vehicle comprising using independently measured changes in position of the vehicle relative to an inertial coordinate frame.

What is claimed is:

1. A vehicle inertial navigation system comprising:
a first mechanism mounted on a vehicle for receiving from an external source a first set of acceleration measurements that do not include components of acceleration caused by the Earth's gravitational field relative to a first orthogonal coordinate frame;
a second mechanism mounted on the same vehicle for obtaining a second set of acceleration measurements that include components of acceleration caused by the Earth's gravitational field relative to a second orthogonal coordinate frame, the origins of the first and second orthogonal frames not co-located; and
a third mechanism for determining relative movement between the first coordinate frame and second coordinate frame upon movement of the vehicle using the first set of acceleration measurements and the second set of acceleration measurements.

2. The system of claim 1 wherein the third mechanism includes a Kalman filter for combining the first set of acceleration measurements and the second set of acceleration measurements before determining relative movement of the vehicle.

3. The system of claim 2 wherein the third mechanism removes gravity components from the second set of accelerometer measurements prior to using the Kalman filter for combining the first and second sets of acceleration measurements.

4. The system of claim 3 wherein the third mechanism further uses the differences between the first set of acceleration measurements and the second set of acceleration measurements to periodically modify a transformation matrix used to convert between an instrument coordinate frame and a navigation coordinate frame.

5. The system of claim 1 wherein the third mechanism further uses differences between the first set of acceleration measurements and the second set of acceleration measurements to periodically modify a transformation matrix used to convert between an Earth fixed coordinate frame and a navigation coordinate frame.

6. The system of claim 1 wherein the third mechanism further uses differences between the first set of acceleration measurements and the second set of acceleration measurements to periodically modify determination of the velocity of the vehicle relative to the earth.

7. The system of claim 1 wherein the third mechanism further uses differences between the first set of acceleration measurements and the second set of acceleration measurements to periodically modify determination of the vehicle's latitude, longitude, and/or height.

8. The system of claim 1 wherein the third mechanism further uses differences between the first set of acceleration measurements and the second set of acceleration measurements to periodically modify determination of an angular rate of rotation of a navigation coordinate frame relative to an inertial coordinate frame.

9. The system of claim 1 wherein the third mechanism further uses differences between the first set of acceleration measurements and the second set of acceleration measurements to periodically modify determination of an angular rate of rotation of a navigation coordinate frame relative to an earth fixed coordinate frame.

* * * * *